May 26, 1970     Z. FONBERG     3,514,644

PLASMA ELECTROSTATIC GENERATOR OF ELECTRICITY

Filed Jan. 28, 1964     2 Sheets-Sheet 1

INVENTOR.

Zygmunt Fonberg

May 26, 1970     Z. FONBERG     3,514,644
PLASMA ELECTROSTATIC GENERATOR OF ELECTRICITY
Filed Jan. 28, 1964     2 Sheets-Sheet 2

INVENTOR
Zygmunt Fonberg.

United States Patent Office 3,514,644
Patented May 26, 1970

3,514,644
PLASMA ELECTROSTATIC GENERATOR
OF ELECTRICITY
Zygmunt Fonberg, 41 Earls Court Square,
London SW. 5, England
Filed Jan. 28, 1964, Ser. No. 340,652
Int. Cl. H02k
U.S. Cl. 310—10
7 Claims

ABSTRACT OF THE DISCLOSURE

This disclosure is of an electric generator in the nature of a thermal converter as distinguished from one using magnetic fields and moving conductors. Solid granules of particulate matter are driven through a chamber by hot ionized gases which are the products of combustion (of fossil fuels for example). Free electrons are collected at electrodes and potential differences are developed to produce electrical power.

---

This invention relates to a generator, which transfers directly heat into electric energy, producing of alternating or direct electric current.

The present invention is based on a new principle, eliminating need for external magnetic fields, which are used in general in apparatus known as magnetohydrodynamic generators based on "Hall effect."

In the present plasma electrostatic generator of electricity, positive and negative ions moving freely in partially ionised gas are separated by action of electric fields. These fields are formed by an auxiliary source of electric current by the phenomenon of influence on successive layers of moving solid grains. The solid grains are separated by ambient, partially ionised gas, i.e., plasma and forms plurality of condensers coupled in series. Charged grains in contact with collecting electrodes possessing opposite electric signs deposit accumulated electric charges on said electrodes and produces electric current.

It may be noted that electrical efficiency of plasma electrostatic generator of electricity do not depend on temperature, as all free ions discharge their electric charges on collecting electrodes, regardless of the degree of ionisation of gas.

Therefore without loss of efficiency the temperature can be maintained within the limit permissible for materials used to construct the generator without appreciable loss of total efficiency.

This object and other advantages of the invention will become apparent from the following description and drawings in which.

Figure 1:
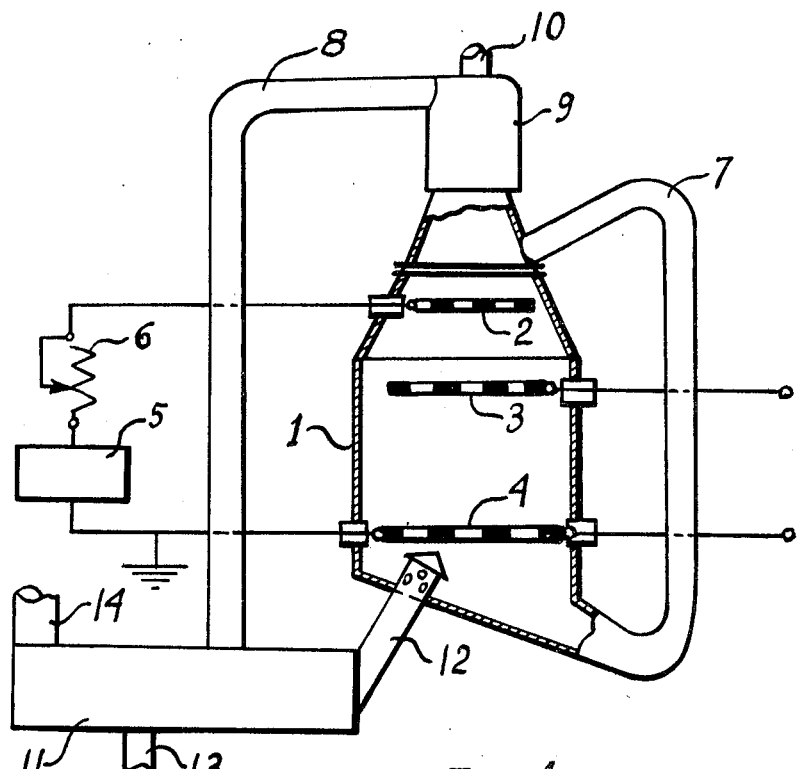
FIG. 1 is a longitudinal cross-sectional view of a plasma electrostatic generator of electricity with schematic view of electrical auxiliary power supply, and electric current receptors.

Plasma electrostatic generator of elasticity shown on FIG. 1 consists of a container 1 in which is located electrode 2, which is charged by auxiliary source of electric current 5, and two electric current collecting electrodes 3 and 4.

The auxilitary source 5 may supply alternating or direct electric current. On the top of container 1 a fuel burner 9 is located, which is supplied by fuel pipe 10, and to which air pre-heated in heat exchanger 11 is introduced by conduit 8.

The solid particles are introduced through conduit 7 and are mixed with products of combustion i.e., with partially ionised gases or plasma. These solid particles due to the action of electric field supplied by source 5 forms plurality of layers of different electric potential i.e., a condenser connected in series. Free electric charges are collected by solid grains and successively discharged according to sign of their electric charges on electrodes 3 and 4. The electrode 4 is connected to the ground and possesses conveniently potential 0. Electrode 3 has potentials induced by influence by electrode 2 which is connected to auxiliary source of electric current 5. The solid grains fall to the bottom of container and are recycled through conduit 7 to the top of container. The products of combustion passes through heat-exchanger 11 and heat fresh air supplied by conduit 13 and after pre-heating through conduit 8 to the fuel burner 9.

Figure 2:
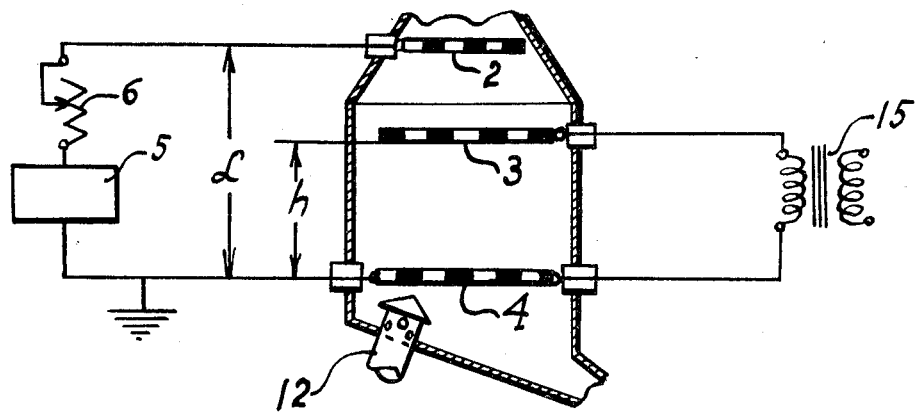
FIG. 2 is a longitudinal partial cross-sectional view of plasma electrostatic generator showing distribution of electric charges, and electric current collecting transformer.

The voltage differential $V_1$ between elactrode 3 and 4 depends on distances $l$ and $h$ indicated on FIG. 2. i.e., on distance between existing electrode 2 and electrode 4 and between electrodes 4 and 3 and is:

$$V_1 = \int_h^L (E_o \pm E_i) dh$$

Where $E_o$ is the potential of auxiliary source, and $E_i$ is the sum of potentials of ionisation. If the areas S of electrodes 3 and 4 are respectively 1 square meter, and the voltage and the voltage differential between them is $V_1 = 10^4$ volt.

The assumed distance $e$ between falling solid grains is 1 millimeter and mean size of grains is also 1 millimeter, and dielectric gas constant is $E = 1$.

The capacity of condenser is:

$$C = \frac{S}{4\pi e} = \frac{1}{4\pi \times 9 \times 10^9 \times 10^{-3}}$$

$$C = 8.9 \times 10^{-9} \text{ farad}$$

and the quantity of accumulated electricity is $$Q = C \times V_1 = 10^4 \times 8.9 \times 10^{-9} \text{ coulomb}$$

If velocity of solid grains is 20 meters sec. and voltage between $V_1 = 10^4$ volt the maximum direct electric current obtained is:

$$I = QV_1 = 0.89 \text{ ampere}$$

And the maximum power is:

$$W = \tfrac{1}{2} IV = 4450 \text{ watt}$$

However when auxiliary source 5 supply alternating current much greater specific efficiency may be obtained, as ability for passing alternating current by a condenser increase proportionately to frequency F.

For $F = 10^3$ cycles per second and efficient voltage $V_1 = 10^5$ volt.

The collected current is:

$$I_2 = 2FCV_1 = 5.65 \text{ amperes}$$

And the maximum power of generator is:

$$W_2 = \tfrac{1}{2} I_2 V_2 = 278 \text{ kw.}$$

Figure 3:
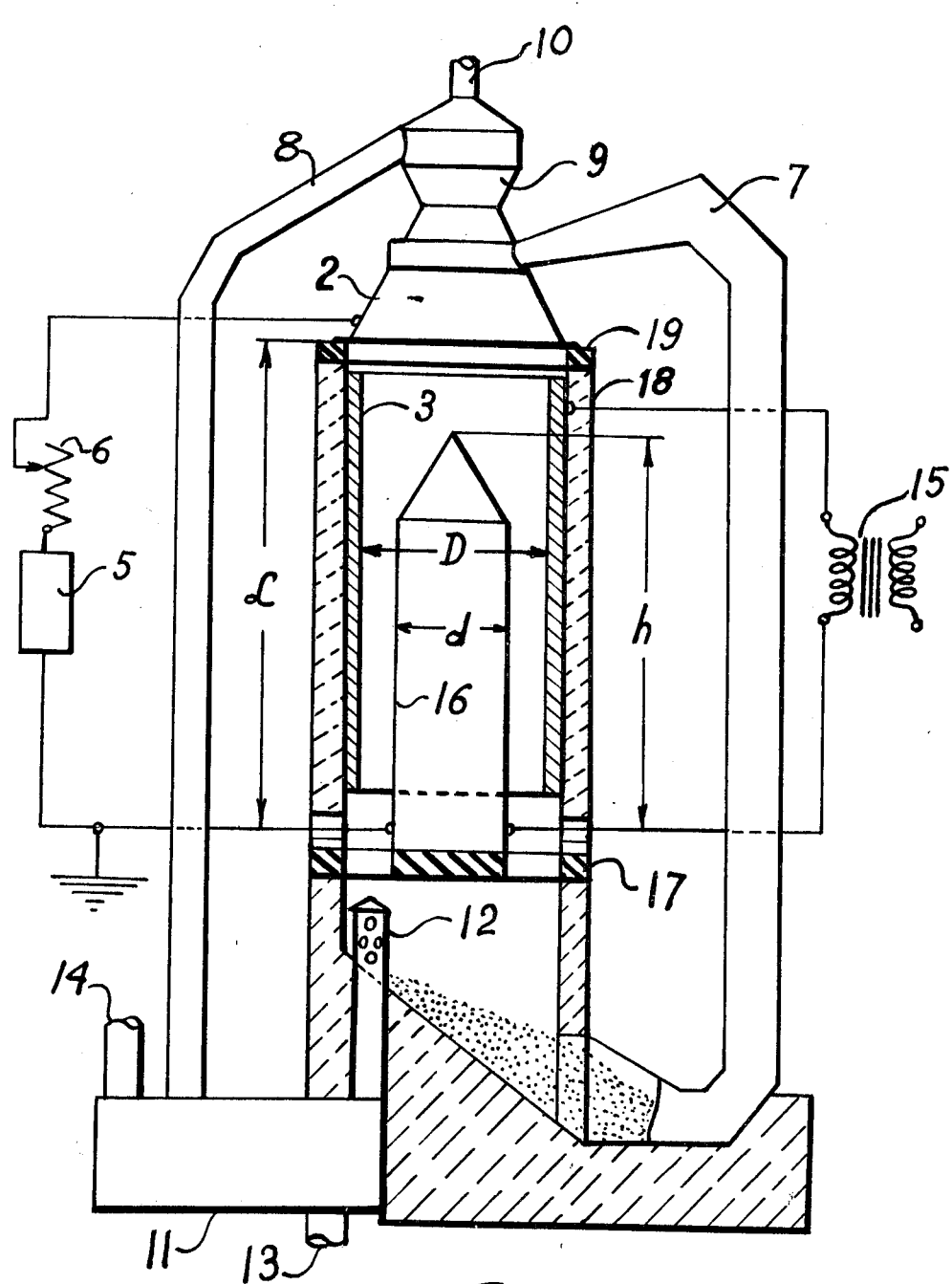
FIG. 3 is a longitudinal partial cross-sectional view of a variant of plasma electrostatic generator of electricity.

Obtained high voltage current may be transformed by transformer 15 to any desirable voltage and by a frequency converter to any frequency, or by a rectifier to direct current. For the practical purpose plasma electrostatic generator of electricity may be constructed in many forms. A plurality of electrodes arrange geometrically in the way to obtain multiphase alternating current. Large plasma electrostatic generator of electricity is shown on FIG. 3 in which exciting electrode 2 is formed by fuel burner housing insulated from column 18. The grounded collecting electrode 3 is formed by cylindrical lining of said column and insulated from the ground collecting electrode by cylinder 16 provided with conical head. Assuming internal diameter of cylindrical lining 3 $D = 2$ meters, external diameter of cylinder 16 $d=1$ meter, the distance $h=20$ meters and distance $l=15$ meters.

Assuming voltage between collecting electrode 3 and 16 $V_2=10^5$ and frequency of electric current supplied by auxiliay source $F=10^3$ cycles per second, and assuming size of solid grains mixed with gas 1 cubic millimeter in average, and mean distance between adjacent grains 1 millimeter the approximate specific efficiency of such generator may be shown by the following computation.

Capacity:

$$C=\frac{E1}{2\log}\frac{R_2}{R_1}$$

$$R_1=\frac{D}{2}, R_1=\frac{1}{2}$$

voltage between collecting electrodes is $$v=\int_R^{R_1} \cdot E dr$$

Where E is voltage of auxiliary current source $$C=\frac{15}{2(0+0.6931)\times 9 \times 10^9 \times 10^{-3}}=1.21\times 10^{-6} \text{ farad}$$

$$Q=C\times V=1.21\times 10^{-6}\times 10^{-5}=0.12 \text{ coulumb}$$

$$I_3=2\pi fCV=1.21\times 10^1\times 10^3\times 2=760 \text{ amperes}$$

$$W_3=\tfrac{1}{2}I_3V_3=\frac{760\times 10^{-5}}{2\times 10^3}=38,000 \text{ kw.}$$

Assuming power used for auxiliary mechanisms and other losses as 8000 kw. but with electrical efficiency close to 100%. The efficiency of apparatus is $$Ef=\frac{30,000 \text{ kw.}}{38,000 \text{ kw.}}\times 100=79\%$$

To put in operation a plasma electrostatic generator of electricity the fuel burner is lighted, the solid grain and partially ionised gas pass through container and auxiliary current source supply electric potential to exciting electrode. Fresh air pre-heated by products of combustion is supplied to the burner. Electric charges formed by free ions discharges on collecting electrodes generating useful electric current.

In brief the plasma electrostatic electricity generator is an invention which does not depend on degree of ionisation of gases and therefore high overall efficiency may be obtained within the limit of temperature which permits use of common materials for its construction. The specific efficiency of said generator can be improved by use of catalisers consisting of sodium compounds and other substances. In relation to the other methods of heat transfer into electric energy, as magnetohydrodynamic generators, steam and internal combustion engine installations, its weight, efficiency and the cost of construction compares very favourably.

I claim:

1. A plasma electrostatic alternating current generator comprising a container provided with a burner housing at one end and an exhaust duct at the other end, a source of fuel and of ionized combustion gases, forming a plasma, through the container to the exhaust duct, a supply of particulate matter arranged to be entrained and charged by the plasma as it leaves the burner housing, electrodes penetrating into the path of the working fluid and spaced along the path, an auxiliary A.C. electric power supply connected to the first and second of said electrodes positioned respectively nearer the upstream and downstream ends of the container, an output transformer, a third of said electrodes located intermediate the first and second electrodes and arranged with the downstream electrode to supply said output transformer.

2. A plasma electrostatic generator according to claim 1, in which said burner housing forms a polarising electrode connected to said auxiliary power supply, and in which said container wall forms an electricity collecting electrode connected to the opposite pole of said source, vertical ion charges forming another collecting electrode located substantially in the center of said container provided with a preheated fresh air supply to the burner by means of exhausting from said container the products of combustion.

3. A plasma electrostatic generator according to claim 1 and claim 2 in which said auxiliary power supply provides alternating electric potential to said electrodes to transform the voltage of the generated alternating current, and means to rectify said alternating current.

4. A plasma electrostatic generator according to claim 2 in which said housing forms one electricity collecting electrode, and another cylinder located along the axis of said container forms another collecting electrode and in which the said burner housing is conical and forms a polarising electrode connected to said auxiliary electric power supply.

5. A plasma electrostatic generator according to claim 1, in which a plurality of polarising electrodes are connected respectively to phases of a multiphase auxiliary electric power supply and having a plurality of ionic charge collecting electrodes.

6. A plasma electrostatic generator according to claim 1 in which partially ionized gases are mixed with ionization facilitating catalysers.

7. A plasma electrostatic generator according to claim 1 in which an auxiliary polarising source of electricity is provided to supply to the electrodes alternating electric potential the frequency of which can be modulated and the voltage of which can be varied.

References Cited

UNITED STATES PATENTS

| | | | |
|---|---|---|---|
| 2,078,760 | 4/1937 | Hansell | 310—5 |
| 2,827,577 | 3/1958 | Kimberlin et al. | 310—5 |
| 3,297,887 | 1/1967 | Marks | 310—4 |
| 2,004,352 | 6/1935 | Simon | 310—5 |

DAVID X. SLINEY, Primary Examiner